Feb. 16, 1971   W. JEHLE   3,563,680
ROTARY PISTON APPARATUS
Filed Jan. 7, 1969   9 Sheets-Sheet 1

Inventor:
WILHELM JEHLE

Fig. 8

Feb. 16, 1971          W. JEHLE          3,563,680
ROTARY PISTON APPARATUS
Filed Jan. 7, 1969                  9 Sheets-Sheet 7

Inventor:
WILHELM JEHLE
By: Michael S. Harker
Attorney

United States Patent Office 3,563,680
Patented Feb. 16, 1971

3,563,680
ROTARY PISTON APPARATUS
Wilhelm Jehle, Blumberg-Zollhaus Baden, Germany, assignor to Karlheinz Bernhard Kindermann, Blumberg, Germany
Filed Jan. 7, 1969, Ser. No. 789,563
Claims priority, application Germany, Jan. 8, 1968,
P 16 01 817.0
Int. Cl. F03c 3/00
U.S. Cl. 418—237                                              19 Claims

ABSTRACT OF THE DISCLOSURE

A rotary piston apparatus such as a motor, pump or compressor which includes a cylinder having an inner peripheral surface of oval cross section and rotary piston means centrally arranged in the cylinder and comprising a spider and a plurality of sealing members engaging the inner surface of the cylinder and being carried by the spider and guided on arcuate guide faces of the latter for limited movement with respect thereto.

BACKGROUND OF THE INVENTION

Rotary piston apparatus are known in the art which include a rotary piston means comprising a spider and a plurality of sealing members mounted on arcuate guide faces of the spider and engaging with outer surfaces thereof the inner peripheral surface of a cylinder having a cross section of oval outline.

It is an object of the present invention to improve the mounting of the sealing members on the concave guide faces of the spider and to improve also the form of the inner peripheral surface of the cylinder so as to reduce the drag of the sealing members on the inner peripheral surface of the cylinder to thereby improve the efficiency of the apparatus.

It is a further object of the present invention to provide for a rotary piston apparatus of the aforementioned kind which is constructed of relatively few and simple parts so that the apparatus may be manufactured at reasonable cost and will stand up properly under extended use.

SUMMARY OF THE INVENTION

With these objects in view, the rotary piston apparatus according to the present invention comprises a cylinder having an inner peripheral surface of oval cross section and rotary piston means coaxially arranged in the cylinder and comprising a spider provided with recesses and having at least two arms, at least two sealing members guided by the spider and tightly engaging the inner peripheral surface of the cylinder, and connecting means located at least in part in the recesses of the spider and connecting the sealing members to the spider for limited movement with respect thereto. In this way a movable mounting of the sealing members on the spider is provided so that the relatively large friction forces which occur between the concave guide faces of the spider and the corresponding slide faces of the sealing members are reduced.

In order to reduce the friction further, the connecting means preferably comprise roller means between the spider and the sealing members. An especially advantageous arrangement is obtained when the axles of the roller means are fixedly connected to the sealing members and the rollers, turnably mounted on the axles, are arranged to roll, during relative movement of the sealing members and the spider, on guide faces of the latter. The sliding friction between sealing members and guide faces of the spider in the arrangements according to the prior art is thus transformed into a rolling friction with the arrangement according to the present invention so that the friction forces will be considerably reduced.

Preferably, at least two roller means having parallel axes are arranged for each sealing member so that a proper guiding of the latter on the guide face of the spider will be obtained and the friction forces be further reduced.

Preferably, the roller means of each sealing member are asymmetrically arranged with respect to an axial plane of symmetry of the latter. This asymmetrical arrangement of the roller means will assure that even in the dead center position of the rotary piston a turning moment will be created. Preferably, a pair of roller means are provided on each sealing member and the axis of the roller means which leads in direction of rotation of the piston a turning moment in the direction of rotation of symmetry than the axis of the trailing roller means, which will assure that in the dead center position of the rotary piston a turning moment in the direction of rotation of the rotary piston will be produced.

In order to improve the seal provided by the rotary piston, sealing means are preferably provided between the arms of the spider and the sealing members carried by the spider. This will assure, when the rotary piston apparatus is a motor, a perfact separation of the combustion gases in the combustion spaces between the sealing members and the peripheral inner surface of the cylinder from the lubricating means in the remainder of the inner space of the cylinder.

The sealing means for the rotary piston preferably include further for each of the sealing members a pair of first sealing strips carried by the sealing member and engaging the inner peripheral surface of the cylinder and a second pair of sealing strips respectively engaging opposite end faces of the cylinder. Adjacent ends of the sealing strip are set into cylindrical sealing bodies which are slidingly arranged in axially extending bores of the sealing members and which are spring pressed against the respective side face of the cylinder. This arrangement assures that the sealing strips do not overlap which provides for an improved seal.

An especially advantageous construction is obtained when the cylindrical sealing bodies and the bores in which the same are arranged have a circular cross section. However a cross section different from a circular cross section may also be used.

If the rotary piston apparatus according to the present invention is used as compresor or pump, then the sealing strips are preferably formed from wear-resistant plastic material and polytetrafluorethylene mixed with bronze powder has been found especially suitable for this purpose.

In order to assure a smooth operation of the rotary piston apparatus and to further reduce the friction between the rotary piston and the inner peripheral surface of the cylinder, the inner peripheral surface of the cylinder may, according to a further feature of the present invention, be constructed in such a manner that the oval cross section of the inner peripheral cylindrical surface is defined by a continuous endless curve constituted by a first pair of oppositely arranged circular arcs of equal length and a second pair of oppositely arranged circular arcs of equal length joined to opposite ends of the first pair and wherein the center of each arc of the first air of arcs is located on the shorter axis of the oval between the center of the oval and the opposite arc of the first pair, whereas the center of each arc of the second pair of arcs is located at the intersection of the longer axis of the oval with a straight line passing through one end of an adjacent one of the pair of first arcs and the center point thereof. Preferably, the ends of the arcs are located on the angle bisector of the axes of the oval and the chords connecting the ends of the first pair of arcs and the chords connecting the ends of the second pair of arcs are of equal length and the radius of each of the first pair of arcs has a length substantially equal to ¾ of the length of the shorter axis of the oval.

According to a further feature of the present invention, the spider may have for each of the sealing members a guide face engaged by a corresponding face of the respective sealing member and each of the guide faces on the spider and the corresponding face on the respective sealing member have preferably in a cross section normal to the axis of the spider a contour in form of a circular arc. Preferably the spider is provided with three guide faces which are arranged angularly equally spaced from each other about the axis of the spider. The circular arcs which define the cross section of the guide faces on the spider are preferably constructed in such a manner that the center of the circular arc is located, when the guide face is arranged symmetrically with respect to the shorter axis of the oval of the inner peripheral surface of the cylinder, at the intersection of a continuation of this shorter axis with a straight line normal to an angle bisector of the axes of the oval and passing through the intersection of the angle bisector with the oval, that the radius of this circular arc corresponds to the distance between the center thereof and the adjacent intersection of the bisector with the oval and that each of the arms of the spider has a length substantially equal to half of the length of the shorter axis of the oval.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FG. 4 is a cross section through a second embodiment according to the present invention and taken along the line IV—IV of FIG. 5.

DESCRIPTION OF THE PREFERRED EMBODIMENTS

Figure 1:
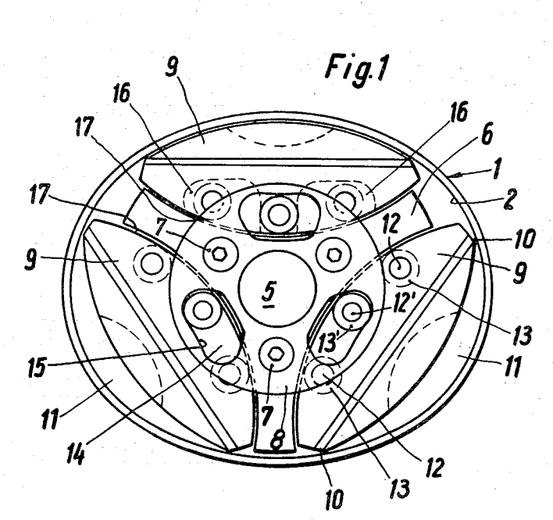
FIG. 1 is a cross section through a first embodiment of a rotary piston apparatus according to the present invention, which cross section is taken substantially along the line I—I of FIG. 2.
Figure 2:
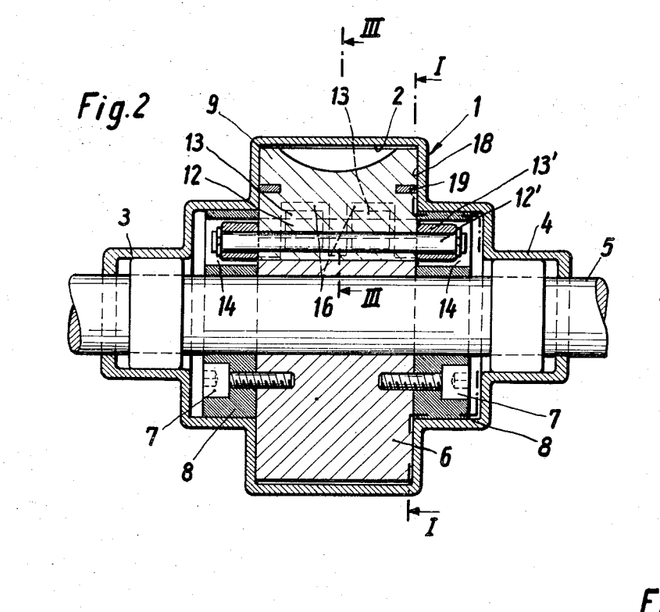
FIG. 2 is an axial cross section of the embodiment shown in FIG. 1.
Figure 3:
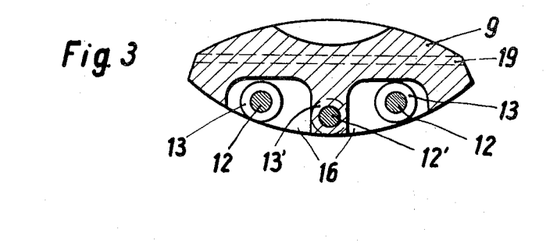
FIG. 3 is a cross section taken along the line III—III of FIG. 2.

Referring now to the drawings, and more specifically to FIGS. 1–3 of the same, it will be seen that the rotary piston apparatus according to the present invention comprises a cylinder 1 having an inner peripheral surface 2 of substantially oval cross section.

A rotary drive shaft 5 is centrally mounted in bearings 3 and 4 which are connected to the cylinder 1 in any convenient manner, not specifically shown in the drawing. A three-armed guide spider 6 is coaxially mounted on the shaft 5 for rotation therewith by being for instance keyed thereto. Circular end plates 8 are fixedly connected by screws 7 to opposite end faces of the spider 6. A sealing member 9 is arranged between each two arms of the spider 6. Each of the sealing members 9 abuts with two sealing edges 10 under pressure against the inner peripheral surface of the cylinder. The sealing members 9 form between the outer faces thereof and the inner peripheral surface of the cylinder spaces 11, the volumes of which periodically increase and decrease during rotation of the spider 6 and the sealing members 9. The spaces 11 form, when the rotary piston apparatus illustrated in FIGS. 1–3 is used as motor, combustion spaces and the passage means for feeding combustible fluid into the spaces, and for discharging the combustion gases therefrom as well as the means for igniting the combustible material are not shown in the schematic FIGS. 1–3.

The sealing members 9 are connected to the spider 6 for limited movement with respect thereto and the connecting means for connecting the sealing members to the spider comprise, in the embodiment shown in FIGS. 1–3, roller means including for each sealing member three symmetrically arranged axles 12 and 12′ extending parallel to the axis of the shaft 5 and rollers 13, respectively 13′ turnably mounted on each of the axles. The central axle 12′ of each sealing member extends through a bore in the latter and with opposite ends in two elongated openings 14 formed in the end plates 8 and the rollers 13′ mounted on opposite ends of the respective axle 12′ roll on the radial outer faces 15 of the openings 14. The two outer axles 12 of each sealing member 9 extend likewise through bores in the latter and the opposite ends thereof end at the side faces of the respective sealing member. The rollers 13 mounted on the axles 12 are located in recesses 16 formed in the respective sealing member 9 and roll on the concave guide faces 17 formed between the arms of the spider. This will assure proper connection between sealing members and spider and a perfect, nearly friction-free guiding of each sealing member 9 on the respective guide face of the spider 6 for limited movement with respect thereto.

The sealing members 9 are sealed against the end faces 18 of the cylinder and the inner peripheral surface 2 of the latter by sealing strips 19.

Figure 4:
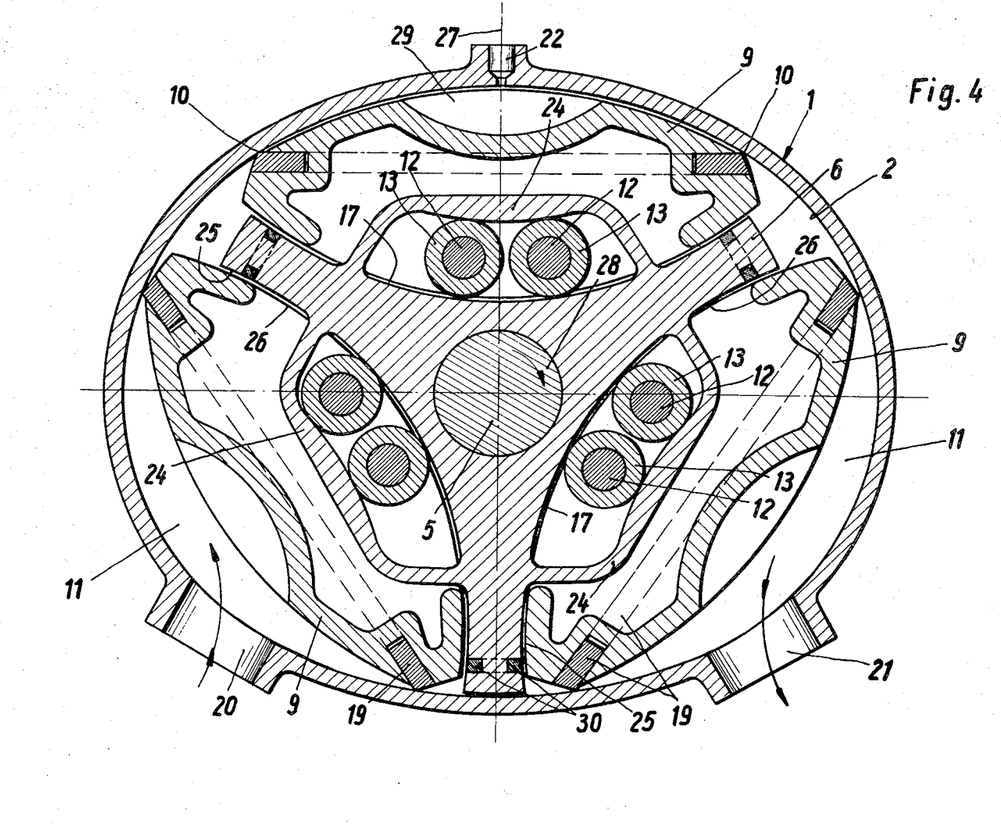
Figure 5:
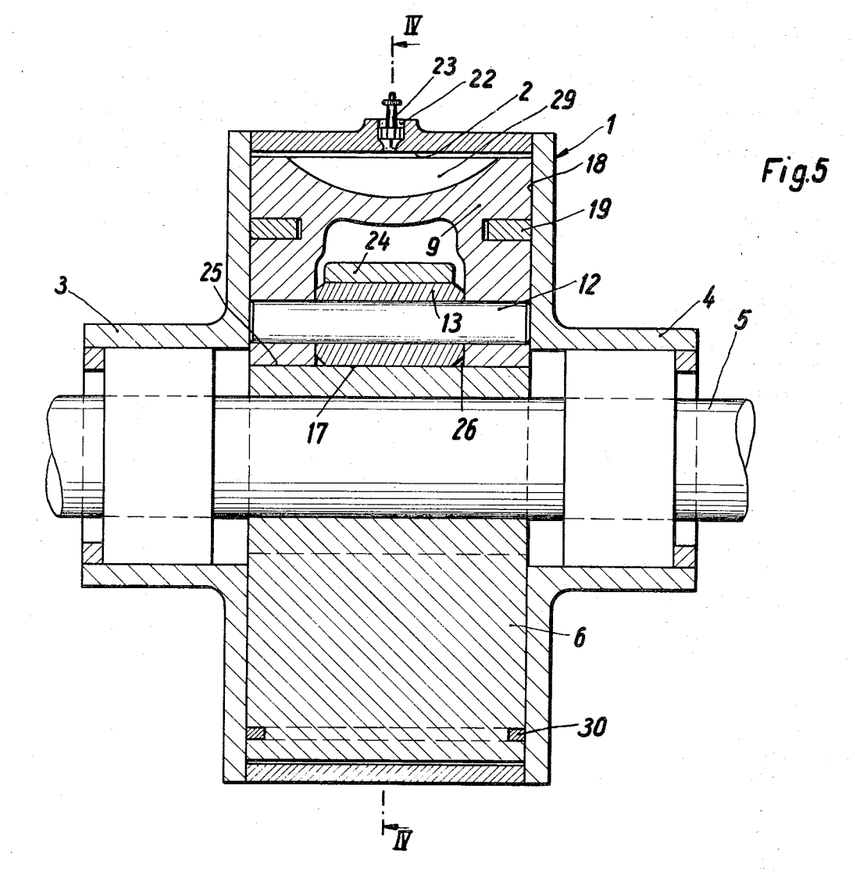
FIG. 5 is an axial cross section through the embodiment shown in FIG. 4.

FIGS. 4 and 5 illustrate a second embodiment according to the present invention in which the rotary piston apparatus is used as a motor. The cylinder 1 is provided in this embodiment with an inlet passage 20 for feeding combustible fluids into the interior of the cylinder and with an outlet passage 21 for discharging combustion gases therefrom. A spark channel 22 is provided in the upper dead center point of the inner peripheral surface 2 of the cylinder and FIG. 5 schematically illustrates a spark plug 23 located in the channel 22. The other element of the embodiment shown in FIGS. 4 and 5 are for the most part constructed substantially in the same manner as in the previously described embodiment and the elements are therefore provided with the same reference numeral as in FIGS. 1 and 2. The following describes therefore only such features of the embodiment shown in FIGS. 4 and 5 which differ from the above-described apparatus shown in FIGS. 1 and 2.

The connecting means between each sealing member 9 and the spider 6 comprise, in the arrangement shown in FIGS. 4 and 5, for each sealing member only two roller means 12, 13 which in this case are located in guide boxes 24 arranged between each two arms of the spider 9. The rollers 13 respectively located in the guide boxes 24 roll on the respective guide face 17 of the spider and the face of the guide box opposite thereto. The guide boxes 24 are respectively arranged in recesses 26 of the respective sealing member 9, which recesses extend from the inner guide face 25 of the respective sealing member into the latter.

According to an important feature of the embodiment illustrated in FIGS. 4 and 5, the axles 12 of the connecting means for each sealing member 9 are arranged asymmetrically with respect to the axial plane of symmetry 27 of the respective sealing member. In the arrangement illustrated, the axles 12 are for the same distance displaced in the direction of rotation of the spider, indicated by the arrow 28, with respect to the plane of symmetry 27. When pressure is exerted during combustion of the combustible material in the combustion space 29 in the upper dead center position of the respective sealing member 9, the rollers 13 mounted on the axles 12 will, due to the asymmetrical arrangement thereof, exert on the guide face 17 of the spider 6 a moment in the direction of rotation 28 of the spider on the latter.

The arrangement shown in FIGS. 4 and 5 is distinguished further by sealing strips 30 which are arranged about the ends of each arm of the spider 6 and which are in sealing engagement with the guide faces 25 of the sealing members 9. In this way, the combustion gases in the combustion spaces 11, 29 are perfectly sealed from the remainder of the interior of the cylinder and from cooling and lubricating means located therein.

Figure 6:
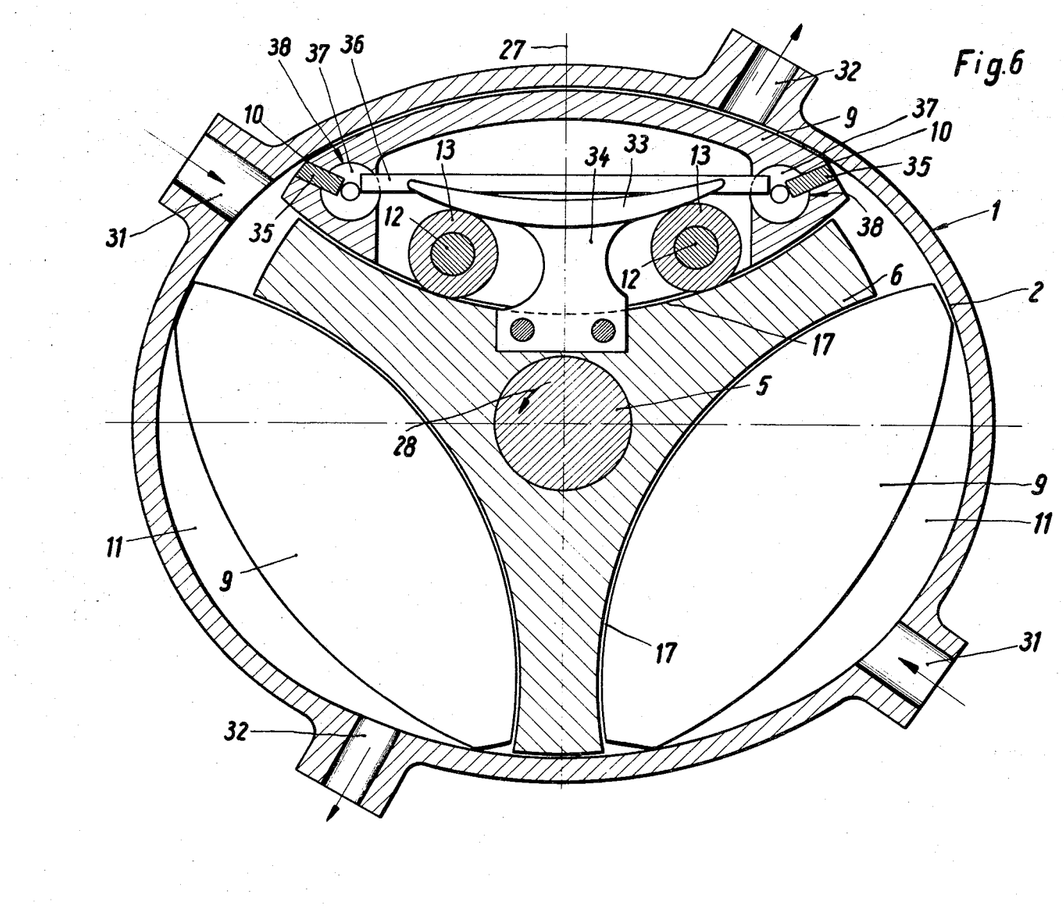
FIG. 6 is a cross section taken along the line VI—VI of FIG. 7 and illustrating a third embodiment in which the rotary piston apparatus is used as a pump.
Figure 7:
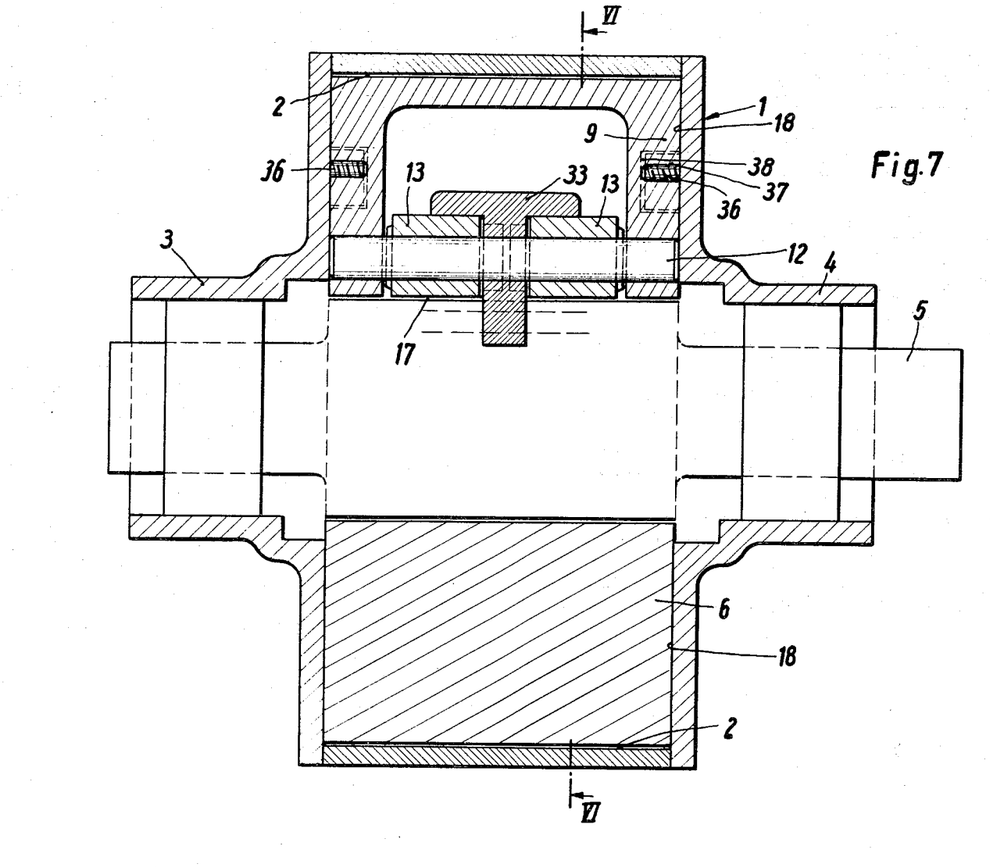
FIG. 7 is an axial cross section of the embodiment shown in FIG. 6.

The embodiment illustrated in FIGS. 6 and 7 is constructed as a pump and has two inlet passages 31 and two outlet passages 32. Only one sealing member 9 is illustrated in detail in FIG. 6, whereas the two other sealing members are oily schematically indicated. In this arrangement the hollow guide boxes 24 of the above-described preceding arrangement are replaced by guide members 33 respectively located between the arms of the spider 6 and connected thereto respectively by supporting legs 34 which are asymmetrically arranged with respect of the axial plane of symmetry 27 of the respective sealing member. The axles 12 of the roller means for each sealing member are displaced in the direction opposite to the direction of rotation of the spider, indicated by the arrow 28, with respect to the plane of symmetry 27 so that, in the dead center position of the respective sealing member 9, the turning moments which are exerted on the two arms of the spider 6 are not exactly equal. This will improve operation of the pump and guiding of the sealing members 9 on the guide faces of the spider.

FIGS. 6 and 7 illustrate also an especially advantageous arrangement of sealing of the sealing members 9 against the peripheral inner surface of the cylinder 1 and against the side faces of the latter. The sealing means illustrated in this embodiment comprises a first pair of sealing strips 35 extending along opposite ends of the respective sealing member 9 and engaging the inner peripheral surface 2 of the cylinder 1 and a second pair of sealing strips 36 which respectively engage opposite end faces 18 of the cylinder. The sealing strips 35 and 36 have adjacent ends which are tightly received in cutouts of cylindrical sealing bodies 37 slidingly arranged in cylindrically extending bores 38 formed in the respective sealing member 9 and which are pressed by springs, not shown in the drawing, against the respective end face 18 of the cylinder. In this way any disturbing influence of the ends of the sealing members on each other is avoided which improves the reliability and the durability of the seal.

FIGS. 8–12 illustrate a further embodiment according to the present invention in which the rotary piston apparatus is used as motor. This embodiment has a cylinder 1, the inner peripheral surface of which is constructed in a manner as will be described later on in detail. A rotary piston comprising a guide spider 6 and three sealing members 9 arranged thereon is mounted on the shaft 5 in the interior of the cylinder. The guide faces 17 on the spider 6 as well as the faces of the sealing members 9 guided thereon are defined in cross section by circular arcs, the construction of which will also be explained later on in connection with FIG. 13. The length of the spider arms is dimensioned in such a manner that the spider 6 may freely rotate in the cylinder.

The cylinder 1 is provided with an inlet passage 20 through which a fuel-air mixture is sucked into the interior of the cylinder, and with an outlet passage 21 through which the combustion gases are discharged from the interior of the cylinder. A spark plug 23 is provided in the upper portion of the cylinder for igniting the comprised fuel-air mixture.

The embodiment illustrated in FIGS. 8–12 will operate as follows:

The rotary piston comprising the spider 6 and the sealing members 9 thereon rotates in the direction as indicated by the arrow A. The rotary piston is centrally arranged in the cylinder so that planetary gears and similar arrangements necessary with eccentrically arranged pistons can be omitted with the arrangement of the present invention.

Figure 8:
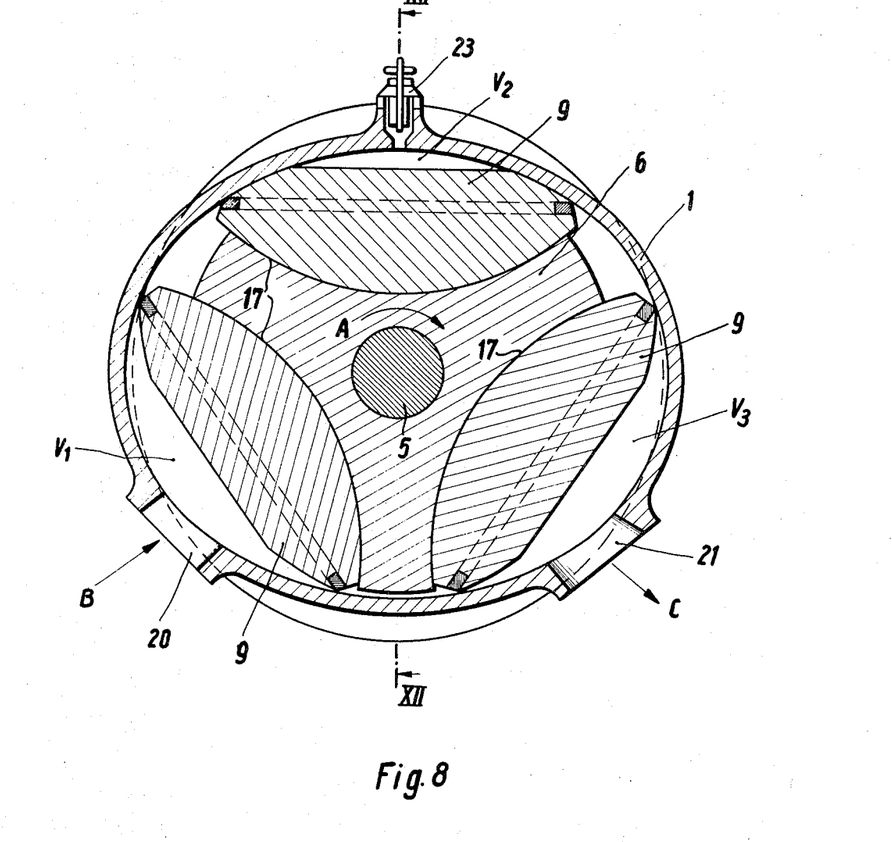
FIG. 8 is a cross section normal to the axis of the apparatus and showing a fourth embodiment of the present invention.
Figure 9:
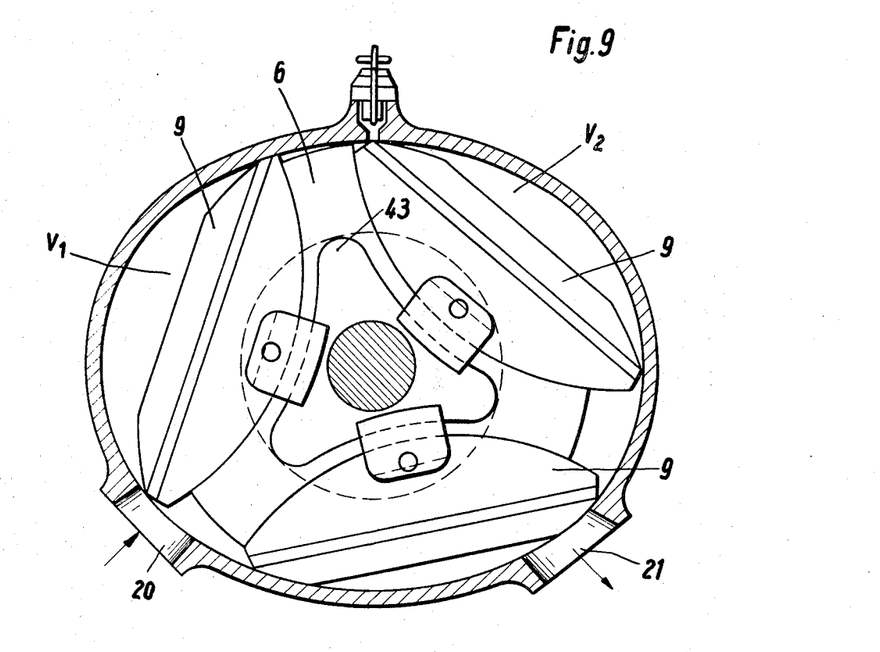
FIG. 9 is a partial sectioned side view of the embodiment shown in FIG. 8 wherein the piston is turned through an angle of 45° from the position shown in FIG. 8.

During rotation of the rotary piston, a fuel-air mixture is sucked through the inlet passage 20 in direction of the arrow B into the chamber defined by the sealing member 9 opposite the inlet passage 20 and a portion of the inner cylindrical surface of the cylinder 1, which chamber has, in the position of the rotary piston as shown in FIG. 8, a value $V_1$. During rotation of the piston in the direction of the arrow A, the fuel-air mixture in the aforementioned chamber will be compressed and the volume of this chamber be reduced to the volume $V_2$, when the respective sealing member reaches the upper dead center position in the region of the spark plug 23. When the respective sealing member 9 reaches the upper dead center position, the compressed fuel-air mixture is ignited and expands to drive thereby the rotary piston in the direction of the arrow A. During further rotation of the piston the combustion gases expand to the volume $V_3$ and they are discharged, after having transferred the major part of their kinetic energy to the rotary piston, through the outlet opening 21 in the direction of the arrow C, whereafter the operating cycle is repeated. FIG. 9 illustrates the rotary piston in an intermediate position in which the inlet and outlet passages 20 and 21 are nearly closed. In this position the gas volume $V_1$ starts to be compressed whereas the ignited gas mixture with the volume $V_2$ is expanding. The combustion gas in the third combustion space has substantially left the latter through the discharge passage 21.

The connecting means connecting the sealing member 9 to the spider 6 of the rotary piston are in this arrangement constituted by members 39 of substantially U-shaped cross section and respectively connected to the sealing members 9 by bolts 41 screwed into corresponding bores 40 in the sealing members with the axially extending radially inwardly located legs 42 of each connecting member engaging in recesses 43 provided in the spider 6. As best shown in FIG. 9, the recess 43 has guide faces engaged by the legs 42 of the respective connecting members and the guide faces defined by the recess are substantially parallel to the inner guide faces of the member 9. The connecting members 39 serve, on the one hand, to guide the respective sealing members 9 on the guide faces of the spider and, on the other hand, serve also to transfer centrifugal forces from the respective sealing member to the spider and the drive shaft so that an excessive sealing pressure between the sealing members and the inner peripheral surface of the cylinder 1 is avoided.

Figures 10, 11:
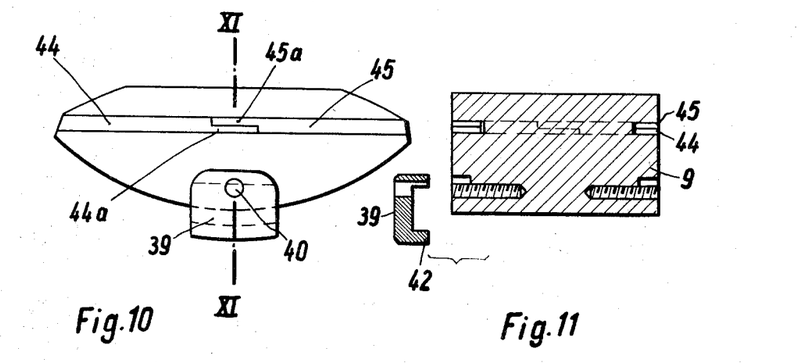
FIG. 10 is a side view of the sealing member used in the embodiment of FIG. 8.
FIG. 11 is a cross section taken along the line XI—XI of FIG. 10.

As best shown in FIGS. 10 and 11, each of the sealing members 9 is provided with sealing strips 44 and 45 which are pressed by springs, not shown in the drawing, against the corresponding faces of the cylinder. The sealing strips 44 and 45 which abut under pressure against the end faces of the cylinder have overlapping ends 44a, respectively 45a. In this way a perfect seal is obtained even when the sealing strips 44 and 45 are, under the influence of the springs acting thereagainst, slightly forced apart.

Figure 12:
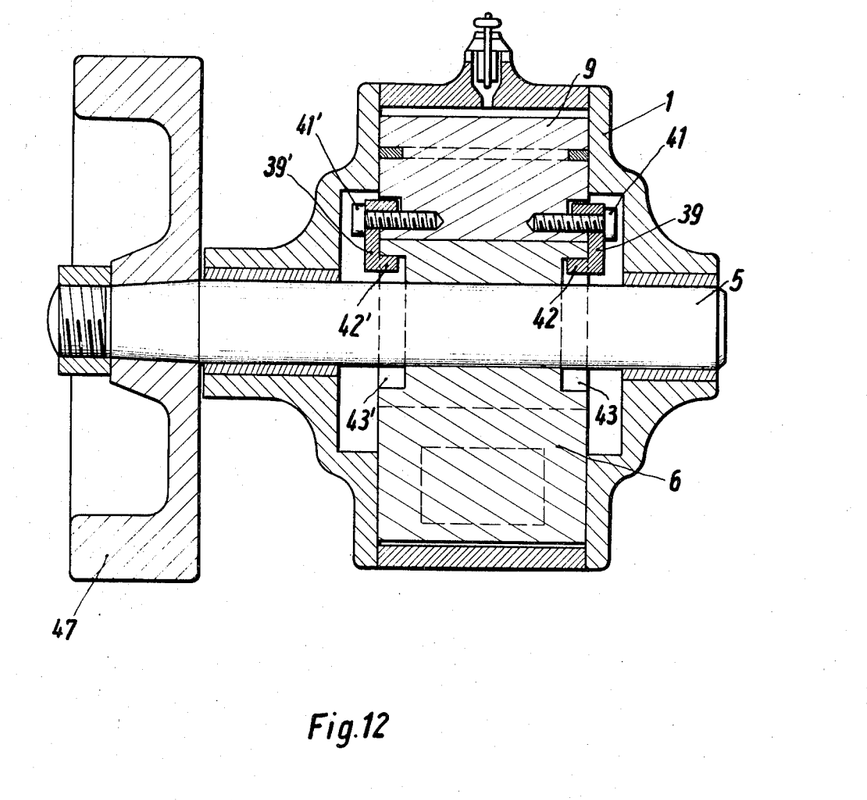
FIG. 12 is a cross section taken along the line XII—XII of FIG. 8.

FIG. 12 is an axial cross section of the rotary piston motor shown in FIGS. 8–11. FIG. 12 shows especially the connecting members 39 and 39' linked to the respective sealing member 9 by the bolts 41 and 41' and the inwardly extending ends 42 and 42' of the connecting members which are guided in the guide recesses 43, respectively 43' of the spider 6. The shaft 5 is turnably mounted in bearings provided in opposite end walls of the cylinder 1. The bearings are only schematically illustrated in FIG. 12 and they are preferably constructed as ball or needle bearings.

To obtain uniform rotation of the rotary piston, a flywheel 47 is preferably coaxially connected to one end of the shaft 5 for rotation therewith.

Figure 13:
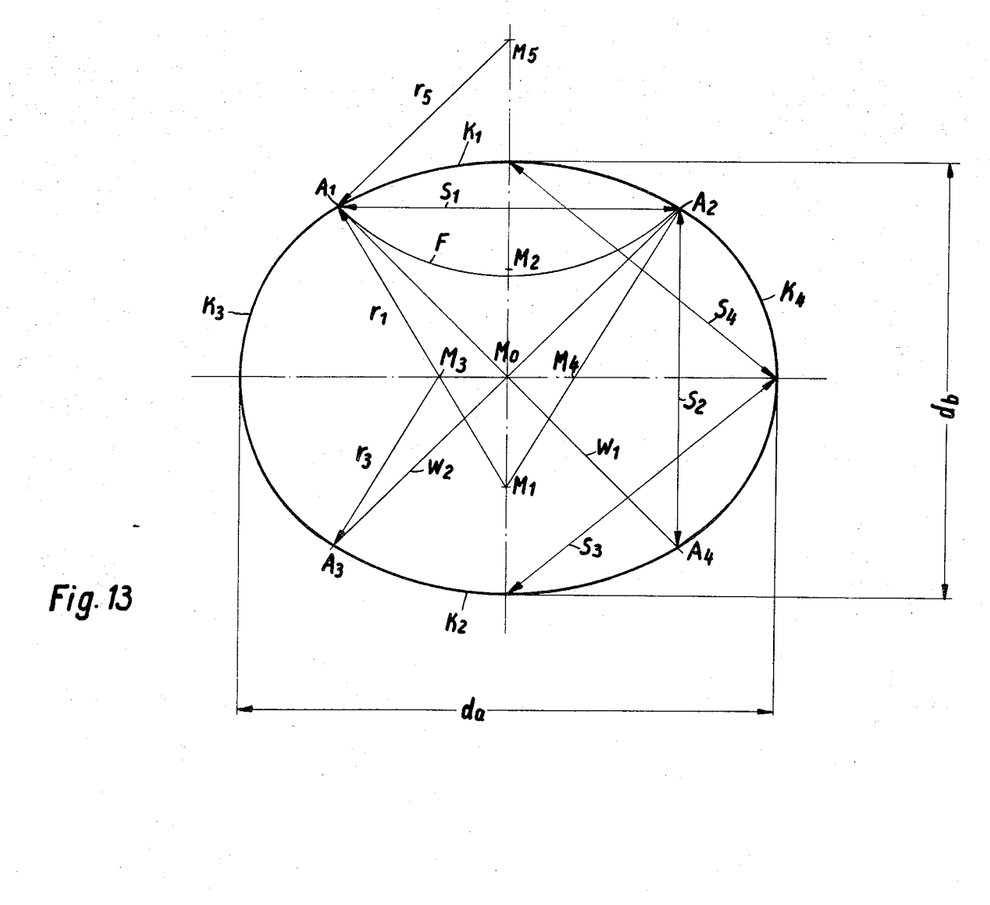
FIG. 13 is a schematic figure illustrating a preferred construction of the inner peripheral surface of the cylinder and one of the guide faces on the spider.

FIG. 13 schematically illustrates a scheme for the construction of the cross sectional contour of the inner peripheral face of the cylinder of the arrangement illustrated in FIGS. 8–12.

The cross sectional contour is defined by an oval constructed in the manner as will now be discussed. The short axis $d_b$ of the oval according to the present invention is predetermined, whereas the long axis $d_a$, which is normal thereto, results from the construction.

The oval is composed of a pair of first circular arcs of equal length $K_1$ and $K_2$ arranged opposite to each other and symmetrically with respect to the long axis and a pair of second circular arcs $K_3$ and $K_4$ of equal length which are arranged opposite to each other and symmetrically with respect to the short axis. The center of the arc $K_1$ is arranged on the short axis between the intersection point $M_O$ of the axes and the opposite circular arc $K_2$, and the radius $r_1$ of the circular arc $K_1$ is preferably ¾ of the length of the short axis $d_b$. The ends of the circular arcs $K_1$ and $K_2$ are located on the angle bisectors $W_1$ and $W_2$ which extend through the center point $M_O$ and which are inclined under 45° to the short, respectively the long axis.

The center points $M_3$ and $M_4$ of the circular arcs $K_3$ and $K_4$ are respectively located at the intersections of straight lines which connect the ends $A_1$ and $A_2$ of the arc $K_1$ with the center $M_1$ of this arc and the long axis $d_a$ of the oval. The radii of the circular arcs $K_3$ and $K_4$ correspond to the distance between the center points $M_3$ and $M_4$ from the end points $A_1$ and $A_2$ of the arc $K_1$.

In this construction, the circular arcs $K_1$–$K_4$ will have at the points $A_1$, $A_2$, $A_3$ and $A_4$ common tangents.

FIG. 13 illustrates also the construction of one of the circular guide faces F of the guide spider. The center point $M_5$ of the arc F is located at the intersection of a straight line normal to the angle bisector $W_1$ and passing through the point $A_1$ with a continuation of the short axis of the oval. The radius $r_5$ of the arcuate face F corresponds to the distance between the center point $M_5$ and the point $A_1$.

In the aforementioned described construction, the chords $S_1$, $S_2$, $S_3$ and $S_4$, shown in FIG. 13, will have equal lengths.

The construction of the inner peripheral surface of the cylinder in the manner as described before and the guide faces F on the spider will assure that the seals on the rotary piston will abut tightly in any angular position of the latter against the inner peripheral surface of the cylinder and this construction will also assure a smooth uniform rotation of the rotary piston.

It will be understood that each of the elements described above, or two or more together, may also find a useful application in other types of rotary piston apparatus differing from the types described above.

While the invention has been illustrated and described as embodied in a rotary piston apparatus in which the cylinder has an oval inner peripheral surface and wherein the rotary piston is arranged centrally with respect to the cylinder, it is not intended to be limited to the details shown, since various modifications and structural changes may be made without departing in any way from the spirit of the present invention.

What is claimed as new and desired to be protected by Letters Patent is set forth in the appended claims:

1. A rotary piston apparatus such as a motor, pump or compressor comprsing, in combination, a cylinder having an inner peripheral surface of oval cross section and a pair of end faces; a rotary shaft coaxially mounted in said cylinder; and rotary piston means fixed to said shaft for rotation therewith and comprising a rigid spider provided with recesses and having at least two arms integrally connected with the remainder of said spider, at least two sealing members guided by said spider and tightly engaging said inner peripheral surface, and connecting means located at least in part in said recesses and connecting said sealing members to said rigid spider for limited movement along said arms with respect to said spider.

2. A rotary piston apparatus as defined in claim 1, wherein said connecting means comprise roller means between said spider and said sealing members.

3. A rotary piston apparatus as defined in claim 2, wherein said spider has concave guide faces, one for each sealing member, and wherein each of said roller means comprises an axle fixed to the respective sealing member and a roller turnably mounted on said axle and rolling on the respective guide face during movement of the sealing member relative to said spider.

4. A rotary piston apparatus as defined in claim 2, wherein said connecting means comprise for each sealing member at least two roller means having axles parallel to the axis of the shaft.

5. A rotary piston apparatus as defined in claim 2, wherein each of the sealing members has an axial plane of symmetry and wherein said roller means are symmetrically arranged with respect to said plane of symmetry.

6. A rotary piston apparatus as defined in claim 5, wherein each of said sealing members is provided with two roller means, and wherein the axis of the roller means which is leading in direction of rotation of the rotary piston means is spaced further from said plane of symmetry than the axis of the trailing roller means.

7. A rotary piston apparatus as defined in claim 1, wherein said recesses are formed in opposite side faces of said spider, and wherein said connecting means comprise a pair of connecting members respectively connected to opposite side faces of each sealing member and having axially extending end portions respectively engaged in said recesses.

8. A rotary piston apparatus as defined in claim 1, and including sealing means between said arms of said spider and said sealing members.

9. A rotary piston apparatus as defined in claim 1, and including sealing means carried by each of said sealing members and comprising a first pair of sealing strips engaging said inner peripheral surface of said cylinder and a second pair of sealing strips respectively engaging said end faces of said cylinder, said pairs of sealing strips having adjacent ends, and a plurality of cylindrical sealing bodies slidingly arranged in axially extending bores of the respective sealing member and receiving in cutouts thereof respective adjacent ends of said sealing strips thereof, each of said sealing bodies being biased against the respective side face of said cylinder.

10. A rotary piston apparatus as defined in claim 9, wherein said bores and said sealing bodies have circular cross sections.

11. A rotary piston apparatus as defined in claim 9, wherein said rotary piston apparatus is a pump or compressor, and wherein said sealing strips are formed from wear-resistant plastic material.

12. A rotary piston apparatus as defined in claim 9, wherein said sealing strips are formed from polytetrafluorethylene compounded with bronze particles.

13. A rotary piston apparatus as defined in claim 1, wherein said oval cross section of said inner peripheral surface of said cylinder is defined by a continuous endless curve constituted by a first pair of oppositely arranged circular arcs of equal length and a second pair of oppositely arranged circular arcs of equal length joined to opposite ends of said first pair and wherein the center of each arc of the first pair of arcs is located on the short axis of the oval and between the center of the oval and the opposite arc of the first pair and wherein the center of each arc of the second pair of arcs is located at the intersection of the long axis of the oval with a straight line passing through one end of an adjacent one of said first pair of first arcs and the center point thereof.

14. A rotary piston apparatus as defined in claim 13, wherein the ends of said arcs are located on the angle bisectors of the axes of said oval and wherein the chords of the arcs between the angle bisectors and between the oval axes are of equal length and wherein the radius of each of said first pair of arcs has a length substantially equal to ¾ of the length of the short axis of the oval.

15. A rotary piston apparatus as defined in claim 1, wherein said spider has for each of said sealing members a guide face between said arms and engaged by a corresponding face of the respective sealing member and wherein each guide face and the corresponding face of the sealing member has in a cross section normal to the axis of the spider a contour in form of a circular arc.

16. A rotary piston apparatus as defined in claim 1, wherein said spider has three guide faces having in a plane normal to the axis of the spider cross sections in form of circular arcs and being arranged angularly equally spaced from each other about the axis of said spider, and three sealing members respectively guided by said guide faces for limited movement relative to said spider.

17. A rotary piston apparatus as defined in claim 16, wherein the center of the circular arc of each guide face is located, when the guide face is arranged symmetrically with respect to the short axis of the oval at the intersection of the continuation of the short axis with a straight line normal to the angle bisector of the axes of the oval and passing through the intersection of said angle bisector with said oval, and wherein the radius of said arc corresponds to the distance between said center thereof and the adjacent intersection of said bisector with said oval, and wherein each of the arms of the spider has a length substantially equal to half of the length of the short axis of the oval.

18. A rotary piston apparatus as defined in claim 1, wherein said sealing members are respectively located between said arms.

19. A rotary piston apparatus such as a motor, pump or compressor comprising, in combination, a cylinder having a pair of end faces and an inner peripheral surface of oval cross section between said end faces and defined by a continuous endless curve constituted by a first pair of oppositely arranged circular arcs of equal length and a second pair of oppositely arranged circular arcs of equal length joined to opposite ends of said first pair, the center of each arc of said first pair of arcs being located on the short axis of the oval and between the center of the oval and the opposite arc of said first pair, the center of each arc of said second pair of arcs being located at the intersection of the long axis of the oval with a straight line passing through one end of an adjacent one of said pair of first arcs and the center point thereof, the ends of said arcs being located on the angle bisectors of the axes of the oval, the chords of said arcs between said angle bisectors and between the oval axes being of equal length, and the radius of each of said first pair of arcs has a length substantially equal to three quarters of the length of the short axis of the oval; a rotary shaft coaxially mounted in said cylinder; and rotary piston means fixed to said shaft for rotation therewith and comprising a spider, at least two sealing members guided by said spider and sealingly engaging said inner piroheral surface of said cylinder, and connecting means connecting said sealing members to said spider for limited movement with respect thereto.

References Cited

UNITED STATES PATENTS

| | | | |
|---|---|---|---|
| 2,367,068 | 1/1945 | Stevenson | 103—140 |
| 2,424,466 | 7/1947 | Jessop | 103—136(A)UX |
| 2,521,236 | 9/1950 | Mac Pherson | 103—140 |
| 2,725,013 | 11/1955 | Vlachos | 103—136(A)UX |
| 3,036,560 | 5/1962 | Geiger | 123—17 |
| 3,369,529 | 2/1968 | Jordan | 123—17X |
| 3,387,596 | 6/1968 | Niemand | 123—17X |
| 3,442,257 | 5/1969 | Walker | 123—17 |

C. J. HUSAR, Primary Examiner

U.S. Cl. X.R.

418—264, 265